United States Patent
Moision et al.

(10) Patent No.: US 9,517,527 B2
(45) Date of Patent: Dec. 13, 2016

(54) METHOD OF DRESSING A RESISTANCE SPOT WELDING TIP

(71) Applicant: Ford Global Technologies, LLC, Dearborn, MI (US)

(72) Inventors: William C. Moision, Northville, MI (US); Elizabeth Therese Hetrick, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 339 days.

(21) Appl. No.: 14/244,108

(22) Filed: Apr. 3, 2014

(65) Prior Publication Data

US 2015/0283645 A1    Oct. 8, 2015

(51) Int. Cl.
| | |
|---|---|
| *B23C 3/12* | (2006.01) |
| *B23B 5/16* | (2006.01) |
| *B23K 11/30* | (2006.01) |
| *B23K 11/11* | (2006.01) |

(52) U.S. Cl.
CPC ........... *B23K 11/3063* (2013.01); *B23B 5/166* (2013.01); *B23C 3/12* (2013.01); *B23K 11/115* (2013.01); *B23B 2222/21* (2013.01); *Y10T 29/49996* (2015.01); *Y10T 409/3042* (2015.01); *Y10T 409/303752* (2015.01); *Y10T 409/303808* (2015.01); *Y10T 409/304256* (2015.01)

(58) Field of Classification Search
CPC ................ Y10T 409/304144; Y10T 409/3042; Y10T 409/304256; B23K 11/3063; B23B 5/166

USPC .................................................. 409/138–140
See application file for complete search history.

(56) References Cited

U.S. PATENT DOCUMENTS

| | | | | |
|---|---|---|---|---|
| 2,298,633 | A * | 10/1942 | Winlock | B23D 67/00 219/119 |
| 2,357,038 | A * | 8/1944 | Whitesell, Jr. | B23K 11/3063 200/50.32 |
| 4,610,153 | A * | 9/1986 | Nedorezov | B23K 11/3063 219/119 |
| 4,842,456 | A * | 6/1989 | Saito | B23B 5/166 409/140 |
| 7,789,600 | B2 | 9/2010 | Goto et al. | |
| 9,346,118 | B2 * | 5/2016 | Sigler | B23B 5/166 |

(Continued)

FOREIGN PATENT DOCUMENTS

| | | | |
|---|---|---|---|
| EP | 1520647 | A1 * | 4/2005 |
| GB | 1189104 | A * | 4/1970 |

*Primary Examiner* — Erica E Cadugan
(74) *Attorney, Agent, or Firm* — Damian Porcari; Brooks Kushman P.C.

(57) ABSTRACT

A method is disclosed for dressing a resistance stop welding (RSW) tip and a tip dresser apparatus. According to the method, a circumferential shoulder is cut to a predetermined depth from a distal end of the RSW tip. The shoulder is cut in the side wall to provide a reduced radius side wall and a reduced radius distal end on the RSW tip. The depth of dressing the distal end of the RSW tip is controlled by providing a stop that engages a step formed in the side wall formed by the circumferential shoulder. The tip dresser apparatus includes a first cutting blade retained by a first holder that cuts a step into the side wall to a predetermined depth. A second cutting blade retained by a second holder cuts a radiused surface on the distal end until the stop engages the step.

8 Claims, 2 Drawing Sheets

(56) References Cited

U.S. PATENT DOCUMENTS

| | | | |
|---|---|---|---|
| 2008/0078749 A1* | 4/2008 | Sigler | B23B 5/166 219/119 |
| 2009/0279974 A1 | 11/2009 | Goto et al. | |
| 2010/0196115 A1 | 8/2010 | Tedeschi et al. | |
| 2011/0094999 A1* | 4/2011 | Schroth | B23K 11/115 219/117.1 |

* cited by examiner

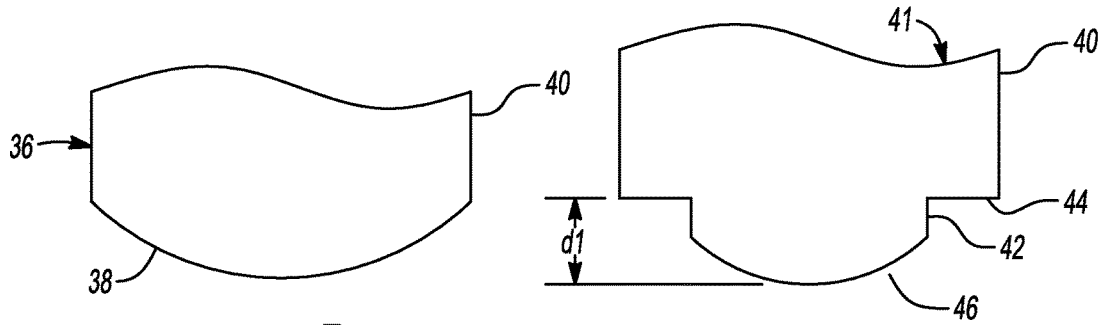
Fig-5 PRIOR ART
Fig-6
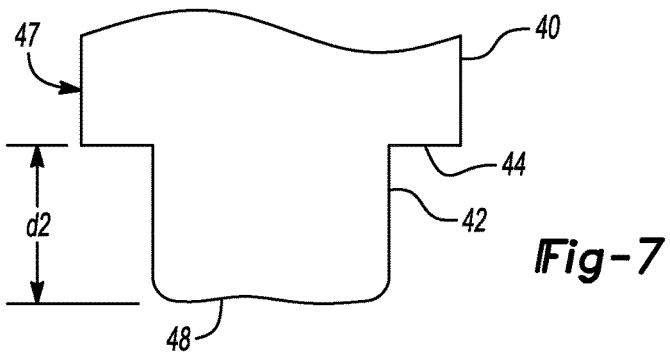
Fig-7
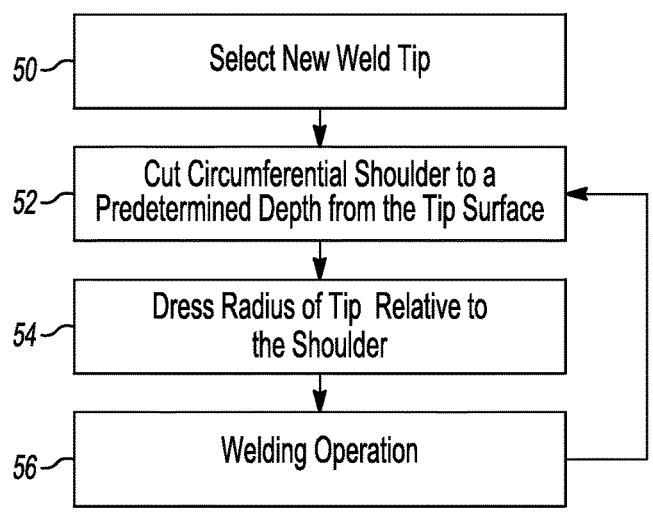
Fig-8

METHOD OF DRESSING A RESISTANCE SPOT WELDING TIP

TECHNICAL FIELD

This disclosure relates to a method of dressing a resistance spot welding tip with a tip dresser.

BACKGROUND

Tip dressers have rotating cutters that are used to clean and reshape copper electrode tips after use in production welding operations. Weld tips for resistance spot welding (RSW) can become worn, deformed or contaminated over the course of repeated welding operations. Worn RSW electrode tips tend to produce welds of lower quality.

Dressing RSW tips is performed with a tip dresser that has rotating cutters that remove copper from the worn electrode tips until the weld tips are returned to their original shape. RSW tips are normally dressed to have a cylindrical side wall that terminates at a convex distal end. The convex distal end may have a desired radius, for example, a radius of 40 mm, or other geometry.

Conventional resistance spot welding electrode dressers have limited if any control over the amount of material removed from each individual electrode face during the dressing process. In addition, the variables that control the conventional dressing process—dress force, dress time, and cutter velocity—do not adapt to changing conditions of the electrode surface, cutter blade and electrode alignment. This lack of control over metal removal during the dressing process can result in poor dress quality or force excess material removal, reducing the life of the electrode and causing additional equipment downtime to change and maintain electrodes. Removing excessive amounts of copper reduces the useful life of the tip and wastes the expensive copper tips.

This disclosure is directed to solving the above problems and other problems as summarized below.

SUMMARY

According to one aspect of this disclosure, a method is disclosed for dressing a weld tip having a cylindrical side wall and a distal end with a tip dresser. The dresser may have two cutting spindles that each have a cutting blade. The method comprises cutting a circumferential shoulder to a predetermined depth from the distal end in the cylindrical sidewall to form a step in the sidewall. A distal end surface is cut to a desired radius until the step is engaged by a stop that limits the amount of material removed from the tip.

According to other aspects of the method, the tip dresser may have a first holder for a first cutter that rotates about a first axis and a second holder for a second cutter that rotates about a second axis. The step of cutting a circumferential shoulder may be performed by the first cutter and the step of cutting the distal end surface may be performed by the second cutter. The method may further comprise welding a plurality of parts together with the weld tip, wearing down the weld tip, and repeating the cutting steps and engaging step.

A weld tip may be selected that may or may not have a shoulder prior to the step of initially cutting the circumferential shoulder.

According to another aspect of the method, a weld tip having a cylindrical side wall and a distal end is dressed with a tip dresser having a sidewall cutting blade and a tip end cutting blade. The method comprises cutting a circumferential shoulder with the sidewall cutting blade to a predetermined distance from the distal end in the cylindrical sidewall to form a step in the sidewall. A distal end surface is cut with the tip end cutting blade until the step is engaged by a stop on the tip end cutting blade that limits an amount of material removed from the tip.

According to another aspect of this disclosure, a tip dresser apparatus is disclosed for dressing a weld tip having a cylindrical side wall and a distal end. The apparatus comprises at least one rotary drive system having a first holder and a second holder operatively connected to the drive system. A first cutting blade is retained by the first holder. The first cutting blade has a first cutting edge oriented to cut a cylindrical area into the sidewall to a predetermined depth and form a step on the sidewall. A second cutting blade is retained by the second holder. The second cutting blade has a second cutting edge oriented to cut a radiused or other geometric surface on the distal end, for example, truncated or flat face geometries. The second cutting blade has a stop that engages the step to limit the extent that the second cutter removes material from the distal end of the weld tip.

According to other aspects of this disclosure as it relates to the tip dresser apparatus, the rotary drive system may be a dual head tip dresser. The first holder may be an insert holder and the first cutting blade may be a first insert that has a cutting edge that is sharpened at a first portion of the cutting edge that engages the sidewall of the weld tip. The second holder may be an insert holder and the second cutting blade may be a second insert that has a radiused cutting edge that is sharpened at a first portion of the insert that engages the distal end of the weld tip. The cutting edge is not sharpened at a second portion of the insert to form a stop on the insert that engages the step on the sidewall.

The above aspects of this disclosure and other aspects are described in greater detail below with reference to the attached drawings.

BRIEF DESCRIPTION OF THE DRAWINGS

FIG. 5 is a fragmentary perspective view of an end of a prior art electrode tip.

FIG. 6 is a fragmentary perspective view of an end of an electrode tip after being cut to form a step in the side wall with the side wall cutting insert and also after being cut to dress the distal end of the electrode tip with the distal end insert.

FIG. 7 is a fragmentary perspective view of an end of a worn electrode tip after being cut to form a step in the sidewall with the side wall cutting carbide insert.

FIG. 8 is a flowchart showing the steps of the method of dressing a weld tip having a cylindrical side wall and a distal end with a tip dresser.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
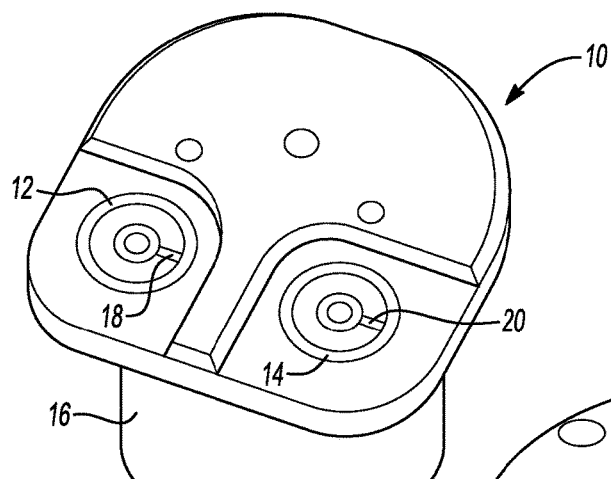
FIG. 1 is a perspective view of a dual head electrode tip dresser.

Referring to FIG. 1, a tip dresser apparatus 10 is illustrated that is preferably a dual head tip dresser. Alternatively, two single headed dressers may also be utilized. The tip dresser apparatus 10 includes a first holder 12 and a second holder 14 that are insert holders. The first and second holders 12 and 14 are driven by a rotary drive system 16 to dress resistance stop welding ("RSW") tips used in welding operations. The first holder 12 retains a first cutting blade 18 that is a insert and the second holder 14 retains a second cutting blade 20 that is also a carbide insert. The tip dresser apparatus 10 is used to renew RSW tips that become distorted and/or pitted in the course of RSW operations.

Figure 2:
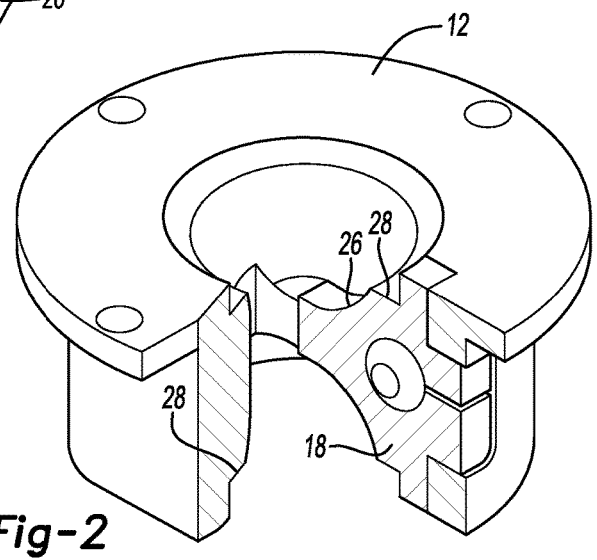
FIG. 2 is a perspective view of a holder for an electrode tip dresser that is shown partially in cross-section.

Referring to FIG. 2, the first holder 12 is shown. The second holder 14 has the same general configuration as the first holder 12. The first cutting blade 18 is assembled to the first holder 12.

Figure 3:
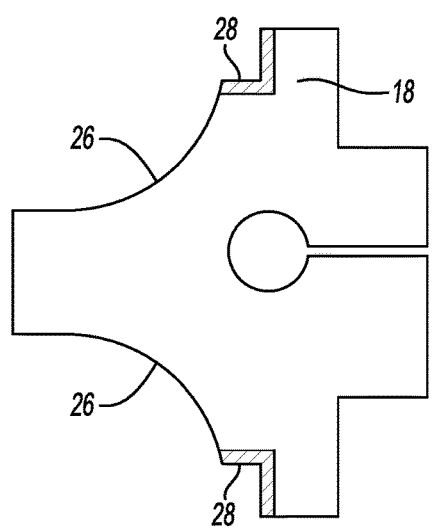
FIG. 3 is an elevation view of a sidewall cutting carbide insert for the holder for the electrode tip dresser.

Referring to FIG. 3, a first cutting blade 18 is shown that includes a first edge 26. The first edge 26 is only sharpened at a first portion 28 and is adapted to engage a side wall of a RSW tip. The first portion 28 of the first edge 26 is used to cut a shoulder at a predetermined distance from the distal end of the RSW tip, as will be more fully described below with reference to FIGS. 5-8. The first portion 28 on the top portion of the first cutting blade 18 in FIGS. 2 and 3 engages the top electrode. The cutting edge 26 and first portion 28 on the lower portion of the blade 18 is used to dress a bottom electrode when the top electrode is dressed. However, it should also be understood that the top and bottom or fixed and moveable electrodes may be independently dressed.

Figure 4:
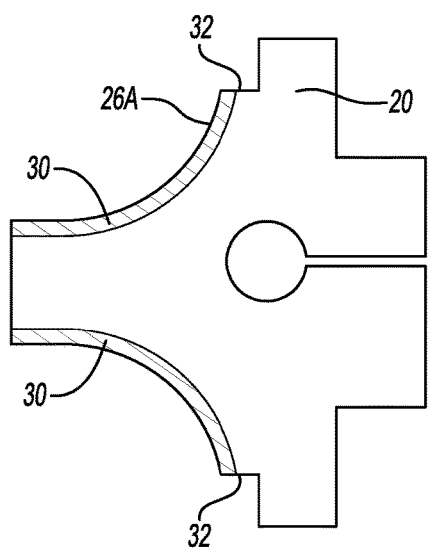
FIG. 4 is an elevation view of a distal end cutting carbide insert for the holder for the electrode tip dresser.

Referring to FIG. 4, the second cutting blade 20 is illustrated. The second cutting blade 20 includes a first cutting edge 26A that has a second portion 30 that is sharpened and engages the distal end of the RSW tip after it is worn. A stop 32 is formed on the second cutting blade 20 that is adapted to engage the shoulder formed by the first portion 28 of the first cutting blade 18. When the stop 32 engages the shoulder, the tip dressing operation is terminated and excessive dressing of the RSW tip is prevented, as will be more fully described with reference to FIGS. 5-8 below.

Referring to FIG. 5, a prior art weld tip 36 is shown that includes a dressed weld face 38 on the distal end of the weld tip 36. The prior art weld tip 36 also includes a cylindrical side wall 40. The prior art weld tip 36 is useable in an as-provided condition. According to this disclosure, however, a prior art weld tip 36 is initially dressed to provide a consistent RSW tip weld geometry, as shown in FIG. 6.

Referring to FIG. 6, a RSW tip 41 dressed according to this disclosure is shown that has a side wall 42 that is reduced in diameter compared to the side wall 40 of the balance of the length of the RSW tip. A circumferential shoulder 44 is formed that extends radially between the side wall 40 and the side wall 42. The shoulder is disposed at a depth "d1" from the distal end of the tip 41. A dressed distal end 46 is provided inside the inset side wall 42.

Referring to FIG. 7, a RSW tip 47 is shown to have a worn distal end 48. The worn distal end 48 is shown after the tip dresser apparatus 10 has been used to recut the side wall 40 to form the inset wall 42 and form the circumferential shoulder 44 at a predetermined distance "d2" indicated by the dimension arrow in FIG. 7. The dimension "d2" is greater than the dimension "d1" shown in FIG. 6. After the first cutting blade 18 forms the cylindrical shoulder 44, as shown in FIG. 7, the second cutting blade 20 is used to dress the worn distal end 48, as shown in FIG. 7, to form a smooth radiused distal end 46, as shown in FIG. 6, or may be dressed to create a flat end, or truncated end, or the like.

Referring to FIG. 8, the process disclosed is shown with reference to a flowchart. The first step of the process is to select a RSW tip at 50 that may be a new weld tip having a conventional single side wall with a radiused distal end, as shown in FIG. 5. Before this tip is used, a circumferential shoulder is cut to a predetermined depth d2 from the tip surface at 52. The depth d2 of the shoulder is determined by the depth of the step cutter 28 in the cutting blade 18. New RSW tips are dressed initially to have a shoulder and a reduced width distal end 46 so that the initial welds are consistent with welds that are made with RSW tips that are dressed according to the disclosed method. Next, at 54, the RSW tip radius is dressed until the stop 32 engages the shoulder 44. The stop 32 is dull, or not sharpened, so that it does not cut into the previously formed shoulder 44, but instead engages the shoulder 44 to limit the extent of dressing of the tip. In this way, the amount of material remaining after dressing the RSW tip is the dimension "d1" shown in FIG. 6.

After dressing, welding operations are performed at step 56 until the RSW tip becomes pitted, distorted, worn, or becomes alloyed as a result of the welding operations. The RSW tips are then dressed by the tip dresser apparatus 10 at step 52 by again cutting a circumferential shoulder in the RSW tip and then dressing the tip face in step 54.

In operation, a resistance spot welder would weld for a period of time and wear away or build up a small amount of material from or on the face, for example 0.07 mm. A two-step cutting process is used to control the amount of material that is being removed during electrode dressing. In the first step, the worn electrode face is used as a reference to accurately machine a step on the outside diameter of the electrode at a known, for example, 6.00 mm, depth. The second step uses a different cutter that uses this 6.00 mm step as a hard stop to accurately dress a fixed amount, for example 0.10 mm, from the face. To enable this, the second cutter would bottom out on the step and the cutter would stop cutting at a depth of 5.90 mm. This system would accurately remove 0.10 mm from each electrode face and return it to the original condition. In the event of excessive build-up on the cap (≥0.1 mm, in this example), the second cutter would simply bottom out on the previously cut step, thereby still resulting in the effective cleaning of all build-up from the cap surface.

The two-step cutting process could be performed with a single or a double-headed production electrode dresser with a simple modification to the cutting blades to enable the step cutting process.

The mechanical hard stop would afford more robust and precise dressing than the sole employ of servomotor torque and/or position control because the robustness of such measurements is susceptible to inadequate equipment rigidity and excessive deflections. Dresser servomotor torque monitoring could be employed to confirm dress completion. Excess cutting time would not affect cap life, as the cutter bottoms out and ceases to remove material. The process would repeat until the electrode was worn out and needed replacement.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method comprising:
    cutting a circumferential shoulder in a cylindrical sidewall of a weld tip with a dresser to a predetermined depth from a distal end surface of the weld tip to form a step;
    cutting a distal end surface of the weld tip with the dresser; and
    engaging the step with a stop of the dresser that limits an amount of material removed from the distal end surface of the weld tip.

2. The method of claim 1 wherein the dresser has a first holder for a first cutter that rotates about a first axis and a second holder for a second cutter that rotates about a second axis, and wherein the step of cutting the circumferential shoulder is performed by the first cutter, and wherein the step of cutting the distal end surface is performed by the second cutter.

3. The method of claim 2, wherein the second cutter comprises the stop.

4. The method of claim 1 after the step of engaging the step, the method further comprises:
    welding a plurality of parts together with the weld tip;
    wearing down the weld tip; and
    repeating the cutting steps and the engaging step.

5. A method of dressing a weld tip having a cylindrical side wall and a distal end with a tip dresser having a sidewall cutting blade and a tip end cutting blade, comprising:
    cutting a circumferential shoulder with the sidewall cutting blade to a predetermined distance from the distal end in the cylindrical sidewall to form a step in the sidewall;
    cutting a distal end surface of the weld tip with the tip end cutting blade; and
    engaging the step with a stop on the tip end cutting blade that limits an amount of material removed from the tip.

6. The method of claim 5 wherein the tip dresser has a first holder for the sidewall cutting blade that rotates about a first axis and a second holder for the tip end cutting blade that rotates about a second axis, and wherein the step of cutting the circumferential shoulder is performed by the sidewall cutting blade, and wherein the step of cutting the distal end surface is performed by the tip end cutting blade.

7. The method of claim 5 further comprises:
    selecting a weld tip that does not have a shoulder before the step of cutting the circumferential shoulder.

8. The method of claim 5, wherein after the step of engaging the step, the method further comprises:
    welding a plurality of parts together with the weld tip;
    wearing down the weld tip; and
    repeating the cutting steps and the engaging step.

* * * * *